United States Patent [19]
Giesfeldt et al.

[11] Patent Number: 5,503,668
[45] Date of Patent: *Apr. 2, 1996

[54] CORRUGATING ADHESIVE INCORPORATING SOLUBILIZED CELLULOSIC FIBER AND POLYVINYL ALCOHOL

[75] Inventors: J. E. Todd Giesfeldt, La Grange; Larry E. Fitt, Orland Park; James J. Pienkowski, Oak Forest; Jack R. Wallace, Bolingbrook, all of Ill.

[73] Assignee: CPC International Inc., Englewood Cliffs, N.J.

[*] Notice: The term of this patent shall not extend beyond the expiration date of Pat. No. 5,358,559.

[21] Appl. No.: 278,668

[22] Filed: Jul. 21, 1994

Related U.S. Application Data

[63] Continuation-in-part of Ser. No. 10,247, Jan. 28, 1993, Pat. No. 5,358,559, Ser. No. 209,507, Mar. 9, 1994, and Ser. No. 227,821, Apr. 14, 1994.

[51] Int. Cl.$^6$ .......................... C09J 11/08; C09J 101/02; C09J 103/00
[52] U.S. Cl. .................. 106/162; 106/163.1; 106/203; 106/213
[58] Field of Search ................. 106/162, 163.1, 106/203, 213

[56] References Cited

U.S. PATENT DOCUMENTS

| | | | |
|---|---|---|---|
| 2,772,981 | 12/1956 | Smart | 106/203 |
| 2,808,380 | 10/1957 | Olsen et al. | 524/524 |
| 3,316,190 | 4/1967 | Suzumura et al. | 524/48 |
| 3,355,307 | 11/1967 | Schoenberger et al. | 106/213 |
| 3,425,972 | 2/1969 | Nobile et al. | 524/48 |
| 3,488,724 | 1/1970 | Donermeyer et al. | 524/48 |
| 3,720,633 | 3/1973 | Nickerson | 524/48 |
| 4,094,718 | 6/1978 | Czerwin | 156/210 |
| 4,131,581 | 12/1978 | Coker | 524/48 |
| 4,400,480 | 11/1983 | Silano et al. | 106/213 |
| 4,600,739 | 7/1986 | Krankkala | 524/48 |
| 4,673,698 | 6/1987 | Krankkala | 524/48 |
| 4,677,145 | 6/1987 | Krankkala | 524/48 |
| 4,751,259 | 6/1988 | Roe et al. | 524/52 |
| 4,814,039 | 3/1989 | Willging | 156/328 |
| 4,826,719 | 5/1989 | Murdock et al. | 524/48 |
| 4,831,127 | 5/1989 | Weibel | 536/56 |
| 4,835,198 | 5/1989 | Kohno et al. | 524/52 |
| 4,933,383 | 6/1990 | Murdock et al. | 524/52 |
| 4,941,922 | 7/1990 | Snyder | 106/214 |
| 4,978,411 | 12/1990 | Leake et al. | 156/336 |
| 4,994,115 | 2/1992 | Giesfeldt et al. | 127/67 |
| 5,073,201 | 12/1991 | Giesfeldt et al. | 127/67 |
| 5,075,360 | 12/1991 | Fitt et al. | 524/48 |
| 5,093,393 | 3/1992 | Faber et al. | 524/30 |
| 5,187,210 | 2/1993 | Fitt et al. | 524/48 |
| 5,358,559 | 10/1994 | Fitt et al. | 106/213 |

FOREIGN PATENT DOCUMENTS

| | | |
|---|---|---|
| 509509 | 1/1955 | Canada . |
| 162682 | 11/1985 | European Pat. Off. . |
| 239421 | 9/1987 | European Pat. Off. . |
| 383214 | 8/1990 | European Pat. Off. . |
| 45-19600 | 7/1970 | Japan . |
| 4164089 | 2/1971 | Japan . |
| 618584 | 2/1949 | United Kingdom . |

OTHER PUBLICATIONS

TAPPI Test Methods (1987)* TAPPI, Atlanta, GA.
R. G. Whistler, Starch: Chemistry and Technology, 2nd Edition, Chapter XX, pp. 596–607, Academic Press, Inc., New York, (1984) No month available.
Chemical Abstracts, vol. 103, No. 10, (9 Sep. 1985) Columbus, Ohio, US; abstract No. 72848A, 'Adhesives for Corrugated Cardboards' p. 86; corresponding to JP-A-6004275 (Oji Cornstarch) *abstract*.
Chemical Abstracts, vol. 74, No. 2, (11 Jan. 1971) Columbus, Ohio, US; abstract No. 4886U, Imoto Saburo et al., 'Water–Resistant Adhesives' p. 76; corresponding to JP-B-7019600 *abstract*.

*Primary Examiner*—David Brunsman
*Attorney, Agent, or Firm*—Brooks Haidt Haffner & Delahunty

[57] ABSTRACT

Corrugating adhesives of the carrier, no-carrier and carrier-no-carrier type having excellent dry pin adhesion, green strength and improved water resistance are prepared with solubilized plant fiber as a complete or partial substitute for starch. The adhesive composition contains polyvinyl alcohol, solubilized fiber and, optionally, from about 0.1% to about 99% added starch by weight based on total solubilized fiber and added starch. When the adhesive is the carrier type or the carrier-no-carrier type, the fiber can be solubilized in situ during the process of preparing the carrier phase.

18 Claims, No Drawings

5,503,668

CORRUGATING ADHESIVE INCORPORATING SOLUBILIZED CELLULOSIC FIBER AND POLYVINYL ALCOHOL

CROSS-REFERENCE TO RELATED APPLICATIONS

This application is a continuation-in-part of application Ser. No. 08/010,247, filed Jan. 28, 1993 now U.S. Pat. No. 5,358,559, Ser. No. 08/209,507, filed Mar. 9, 1994 and Ser. No. 08/227,821, filed Apr. 14, 1994.

BACKGROUND OF THE INVENTION

1. Field of the Invention

The present invention relates to corrugating adhesives which contain solubilized plant fiber, such as corn fiber, and polyvinyl alcohol. More particularly, the invention relates to high speed corrugating adhesives of the carrier, no-carrier or carrier-no-carrier type which are prepared by incorporating solubilized corn fiber in the adhesive formulation to obtain excellent pin adhesion and improved water resistance and incorporating polyvinyl alcohol to obtain improved cross-bonding functionality and higher line speeds.

2. Description of Related Art

Adhesives used in manufacturing corrugated board are usually comprised of an aqueous emulsion of starch, caustic, a boron containing compound and, where water resistance is needed, a waterproofing resin. The main binder of corrugating paper is the starch which is gelatinized in the corrugating process as it penetrates the paper fiber. The other components, namely, the water, caustic, boron containing compound, and waterproofing resin are auxiliary agents which modify the basic properties of the starch.

Caustic, usually in the form of sodium hydroxide, directly affects the gelatinization point temperature of the starch. Gelatinization point temperature is often referred to as gel point or gel temperature and is reduced from its natural value of 165° F. (74° C.) for unmodified corn starch to a temperature in the range from about 138° F. (59° C.) to about 160° F. (71° C.) by the addition of caustic. Caustic also enhances penetration of the gelatinized starch into the surface paper fibers allowing for better bonding.

The boron containing compounds perform multiple tasks. The most important function is developing the adhesive tackiness that is crucial in the formation of the "green bond". The green bond is the bond which holds the components of the corrugated board together until final heat curing of the adhesive system. It relies on the viscosity and the tack of the adhesive to maintain the integrity of the product during curing. Corrugating machine speeds therefore are limited by the rate of viscosity increase (i.e., rate of green bond formation) in the bond line between the liner and the corrugated medium. The oxygen atoms attached to the boron form stronger bonds, sometimes called boron bridges, between the starch and cellulose hydroxyl groups. Boron containing compounds also act as buffering agents in the presence of caustic and help maintain the viscosity stability of the adhesive paste.

It is known that polyhydroxy compounds other than starch, such as polyvinyl alcohol, will respond with the boron containing compounds in a manner similar to that with starch. Boron containing compounds and polyvinyl alcohol are believed to interact synergistically to form strong bonds. Like other polyhydroxy compounds, polyvinyl alcohol in the presence of starch will develop adhesive tackiness faster in the presence of boron, which means that the corrugator can operate at higher machine speeds.

Water proof or water resistant resins are considered to be an optional component of adhesives, and although some corrugating plants may not need them, most plants are prepared to use them when needed. Many types of thermosetting resins are suitable. The most common of them are derived from urea-formaldehyde, ketone-formaldehyde or melamine-formaldehyde. When heat and pressure is applied to them in a corrugating machine, they will condense to form an excellent water resistant network. When polyvinyl alcohol is added to adhesives containing these resins, it participates in cross-linking which will improve the water resistant bonds.

In the corrugating process, adhesive is commonly applied to the tips of the flutes of a corrugated medium. Then a noncorrugated flat paper liner is applied against the adhesive coated flutes as they pass between a corrugating roll and a pressure roll. The resulting product has the corrugating medium on one side and a flat liner on the other side and is called a single-faced portion. The single-faced portion may be used "as is" (called a "single facer" board) or adhesive may be applied to the flute tips of the single-faced portion and a second flat sheet can be applied in the same manner as the first in what is called a "double-facer" or a "double-backer" operation. The second liner sheet is treated with heat and reduced pressure (relative to the pressure used to make a single-faced portion) immediately following contact with the adhesive.

Starch-based adhesives which can be of the carrier, no-carrier and carrier-no-carrier type are commonly used in processes for manufacturing corrugated paper board. In carrier type adhesives, a portion of the starch (or dextrin) forms a carrier, often known as the gelatinized phase, which suspends the balance of the starch which is in an ungelatinized state. Under conditions of heat and pressure, the ungelatinized starch is rapidly hydrated and gelatinized to increase quickly the viscosity and adhesivity of the adhesive composition. In no-carrier type adhesives, all of the starch is slightly cooked or swollen with heat and caustic soda for viscosity. Finally, carrier-no-carrier type adhesives have a portion of the starch which forms a carrier and is responsible for about one half of the viscosity and the remaining viscosity is obtained by slightly swelling the uncooked starch.

One of the most important properties of a corrugating adhesive is green strength. Green strength is the characteristic that holds the paper together until the full strength of an adhesive develops. The green strength contributed by conventional starch adhesives is fairly low, but the addition of substances like polyvinyl alcohol improve the property as noted above. Increased levels of green strength, sometimes called early tack, allow corrugating machine operators to increase the speed of their machines without sacrificing the quality of the product.

Polyvinyl alcohol has been added to starch based corrugating adhesives for many years to increase the viscosity and the strength of the bond between the corrugating medium and the liner material. In Japanese Patent Publication Number 45-19600 to Imoto et al. (Jul. 4, 1970), for example, a suspension of powdered polyvinyl alcohol and ungelatinized starch in an alkaline solution of gelatinized starch and borax is described for use in producing highly water-resistant corrugated board. Imoto et al. discloses the use of totally saponified (i.e. fully hydrolyzed) polyvinyl alcohol and water-soluble derivates thereof.

In U.S. Pat. No. 4,094,718 to Czerwin, a fully hydrolyzed polyvinyl alcohol having a fine particle size and low cold water solubles is used in a modified starch-based corrugating adhesive containing borax, alkali and water. The polyvinyl alcohol is in suspension in an aqueous emulsion of the adhesive and is dissolved during the corrugating process when the paper passes between the heated rolls of a corrugating machine.

U.S. Pat. Nos. 4,600,739 and 4,677,145 to Krankkala disclose corrugating adhesives comprised of an aqueous suspension of unmodified starch, caustic, a boric acid compound and a water soluble, partially hydrolyzed, polyvinyl alcohol. Based on the specifications of both patents, these adhesive compositions allow corrugators to attain high line speeds with improved green bond strength. According to U.S. Pat. No. 4,826,719 to Murdock et al., however, it was found that the amounts of soluble polyvinyl alcohol that could be used under the two prior Krankkala patents was limited by the fact that at higher concentrations than claimed, the soluble polyvinyl alcohol tended to form gels as was recognized in Czerwin and Imoto et al.

The Murdock et al. patent discloses a corrugating adhesive based on unmodified starch and containing an alkaline metal hydroxide, a boric acid compound and a cold water insoluble, fully hydrolyzed, polyvinyl alcohol which is heat solubilized in the adhesive composition before application. According to the patent specification, this adhesive composition also allows corrugators to attain high line speeds.

U.S. Pat. No. 5,093,393 to Faber et al. describes the use of an intermediately hydrolyzed polyvinyl alcohol (92–98% hydrolyzed) in starch-based corrugating adhesives, and U.S. Pat. No. 5,075,360 to Fitt et al. discloses the in situ hydrolysis of a cold water soluble polyvinyl alcohol to make a corrugating adhesive having polyvinyl alcohol which is more than about 95% hydrolyzed. In each case, polyvinyl alcohol is said to improve the starch-based corrugating adhesives to which it is added.

Synthetic polymers that affect green strength tend to be expensive and their prices follow the volatility of the petroleum market. These polymers also are perceived by the public as less desirable than natural products. Moreover, the use of such polymers can require additional processing steps which adds expense for the corrugator.

Another important property of corrugating adhesives is known as dry pin adhesion. This is a measure of bond strength and the percentage of paper failure versus adhesive failure.

According to U.S. Pat. No. 4,941,922, fibers can be added to starch-based corrugating adhesives to enhance adhesion and dispersion and yield improved adhesive characteristics including increased waterproofness, dry strength, viscosity and adhesiveness. The fibers disclosed generally are insoluble fibers which have certain mechanical properties in that they provide interlocking filaments. Suitable sources of fiber are described as cellulosic fiber including wood, paper, cotton and rayon; fibers of synthetic origin including Nylon, polyester, polypropylene, Lycra Spandex, Vyrene, Vinyon, Dynel, Saran, Creslan, acrylic, polyethylene, Teflon, tetrafluoroethylene, glass, Corlon and metallic fibers. Fibers generated during the wheat or corn milling processes are also said to be suitable. According to the patent, the fibers typically are suspended initially in the uncooked starch portion, suspended with the carrier portion, suspended prior to the carrier-no-carrier (or no-carrier) swell or added to the final adhesive mixture prior to storage or use. There is no experimental data in the patent, however, describing the use of fibers generated during the corn milling process and the patent does not disclose the extraction of hemicellulose from fibers of any kind. Furthermore, the fibers must be present in an amount from about 2.2 to about 22 pounds of fiber per 100 pounds of corrugating adhesive and they must be large, having a diameter of between about 0.0005 inches and about 0.02 inches and a length of between about 0.025 inches and 0.25 inches.

It has been found that solubilized plant fiber, particularly corn fiber, a readily available component of corn kernels and hulls, and other plant materials, can be used to enhance dry pin adhesion in starch-based corrugating adhesives. The use of solubilized plant fibers also provides excellent green strength, particularly at low viscosities, which allows for a wider range of viscosities compared with adhesives based primarily on starch. The solubilized fiber can replace some or all of the added starch in typical adhesives.

It has also been found that flatter board can be produced with adhesives containing solubilized plant fibers. This is advantageous when the board is cut and printed. The board also has less fractured liners and cracked scores compared with board produced using adhesives without plant fiber.

Applicants now have discovered that adding polyvinyl alcohol to adhesives containing solubilized plant fiber can further improve line speeds. It is a theory of the invention that the interaction of polyvinyl alcohol with solubilized plant fiber is similar to the interaction of polyvinyl alcohol with starch in the enhancement of cross-bonding functionality on dehydration, particularly in the presence of boron compounds or condensation polymers during the production of waterproofing adhesive.

In the present specification and claims, all parts and percentages are by weight unless otherwise specified, and the term "parts of adhesive" is used to refer to the total weight of adhesive, including water, starch and all chemicals. The term "parts of carrier phase" is used to refer to the total weight of the carrier phase, including water, starch and all chemicals. The terms "total starch" and "total carbohydrate" refer to the total cumulative weight of unmodified starch, modified starch and dextrin present, i.e. all of the carbohydrates. The term polyvinyl alcohol is sometimes written as "poly(vinyl alcohol)" or abbreviated as "PVOH".

SUMMARY OF THE INVENTION

The corrugating adhesive composition of the invention is a carrier, no-carrier or carrier-no-carrier corrugating adhesive which contains solubilized fiber and, optionally, from about 0.1% to about 99%, preferably from about 10% to about 95%, added carbohydrate by weight based on total solubilized fiber and carbohydrate. The fiber can be derived from various plant materials including wood and agricultural products, and a preferred source of fiber is corn. It is recognized by applicants that starch, protein and other impurities will be present with fiber which has not been completely purified, and in such cases the fiber will contain from about 4% to about 60% starch.

Solubilized fiber can be added to the primary or secondary mixer in the preparation of a carrier type corrugating adhesive or it can be added at any stage in the preparation of a no-carrier or a carrier-no-carrier corrugating adhesive. In the preferred embodiment, a fiber such as corn fiber is added to the primary mixer and solubilized in situ in the preparation of a carrier or carrier-no-carrier corrugating adhesive.

Polyvinyl alcohol can be added as a component of the adhesive formulation at various points in time in the same manner in which it is employed in starch-based adhesives, as described in U.S. Pat. Nos. 4,600,739, 4,677,145, 4,826,729, 5,075,360 and 5,093,393, the disclosures of which are incorporated herein by reference.

According to a preferred embodiment, a carrier type corrugating adhesive of the invention is made by the following process:

1. Water, corn fiber and, optionally, added carbohydrate, are mixed with polyvinyl alcohol, having a degree of hydrolysis of less than about 92%, in a primary mixer and heated for at least about 1 minute and preferably from about 1 minute to about 25 minutes at a temperature of from about 115° F. (46° C.) to about 180° F. (82° C.), preferably from about 125° F. (52° C.) to about 145° F. (63° C.):

2. An aqueous solution of caustic is added to attain a pH from about 8 to about 14, preferably from about 12 to about 14, and mixing is continued for at least about 10 minutes and preferably from about 10 to about 40 minutes;

3. Additional water is added and mixing is continued for at least about 1 minute and preferably from about 1 to about 15 minutes, most preferably from about 5 to about 8 minutes, to make a carrier phase;

4. A secondary mixer is charged with water, heated to from about 70° F. (21° C.) to about 120° F. (49° C.), preferably from about 90° F. (32° C.) to about 105° F. (41° C.) and borax is added;

5. Solubilized fiber and, optionally, unmodified starch and/or modified starch and/or dextrin is added, and waterproof resin can be added as an option, to make a suspended phase and the contents are mixed for from about 3 to 25 minutes;

6. The contents of the primary mixer are gradually added to the secondary mixer with continuous mixing. This step typically is carried out over a period of about 5 to 20 minutes.

A single tank system works just as well as the two-part system described above.

The corn fiber which is added to the primary mixer can be any kind of corn fiber. Suitable fibers include crude fiber, typically described as feed, and more finished products such as dietary corn fiber which is made for human consumption. When more finished fiber products are employed, the insoluble residue of the solubilized fiber in the adhesive and/or in a carrier phase will have a particle size of less than about 0.005 inch, a geometric mean size of less than about 0.00005 inch and a median size of less than about 0.00005 inch.

DETAILED DESCRIPTION OF THE INVENTION

The corrugating adhesive of the invention is an aqueous emulsion which employs solubilized fiber essentially to replace some or all of the starch component. The fiber can be pre-solubilized with caustic at a pH from about 8 to about 14 and a temperature from about 80° F. (27° C.) to about 220° F. (104° C., under pressure using a jet cooker) before it is added to the adhesive mix, or it can be solubilized in situ when the conditions (pH and temperature) used to make the adhesive will cause solubilization. Higher pH levels generally will increase the rate of solubilization, as will higher temperatures, and some caustic agents are more effective than others.

There are various options for employing the soluble fiber in the manufacture of corrugating adhesives. In a carrier type adhesive, the starch component that would normally be employed in the carrier phase can be partially or completely replaced with fiber and the fiber then can be solubilized in situ in the presence of a conventional amount of caustic. The suspended phase can then have a conventional amount of starch or some of the starch can be replaced with fiber which has been pre-solubilized. In a no-carrier type adhesive, some or all of the starch component can be replaced with pre-solubilized fiber. Carrier-no-carrier type adhesives can be prepared by solubilizing fiber in situ or by adding pre-solubilized fiber, or both. Variations on the foregoing should be apparent to those skilled in the art.

The polyvinyl alcohol employed according to the invention can be soluble, insoluble or intermediately soluble in cold water and can be hydrolyzed in situ in certain systems as will be more fully described below. The amount employed can vary widely depending upon the objectives of the corrugator. Generally the minimum effective amount will be about 0.01 part per 100 parts of adhesive and preferably will be about 0.05 parts per 100 parts of adhesive, most preferably about 0.1 parts per 100 parts of adhesive. The maximum amount of polyvinyl alcohol employed will depend upon the other components present in the overall adhesive formulation, will be limited by the viscosity of the formulation, and the ability to manage effectively other properties of the adhesive such as storage stability and the ability to transfer the adhesive to the paper. Most corrugating adhesives will contain less than about 2 parts polyvinyl alcohol per 100 parts of adhesive and preferably will contain about 1.5 parts or less polyvinyl alcohol per 100 parts of adhesive.

The corrugating adhesive of the invention is an aqueous emulsion which comprises water; from about 5 to about 35, preferably from about 15 to about 25, parts per 100 parts of adhesive of solubilized fiber and, optionally, an added carbohydrate component; from 0.01 to about 2 parts per 100 parts of adhesive of polyvinyl alcohol; and sufficient caustic to attain a pH from about 8 to about 14, preferably from about 12 to about 14. When an added carbohydrate component is used, it is present in an amount from about 0.1 to about 99%, preferably from about 10 to about 95% by weight of the total solubilized fiber and added carbohydrate component.

In the carrier type embodiment, the carrier phase comprises from about 2 to about 6 parts per 100 parts of adhesive of the solubilized fiber and/or added carbohydrate component and the remaining solubilized fiber and/or added carbohydrate component is in a suspended phase, provided that at least a portion of the suspended phase must include a carbohydrate component in order to have a carrier type system. When the adhesive is a no-carrier type adhesive, the solubilized fiber/added carbohydrate component is partially swollen to attain a viscosity from about 20 to about 40 seconds, preferably from about 25 to about 35 seconds, as determined by an orifice type viscometer, commonly known as a Stein Hall cup. Finally, in the carrier-no-carrier type embodiment from about 0.05 to about 0.10 parts of the solubilized fiber/added carbohydrate component (based on total solubilized fiber and added carbohydrate) is in a carrier phase and the remainder is partially swollen to attain a viscosity from about 30 to about 50 seconds, preferably from about 35 to about 45 seconds, determined in the same manner as for the no-carrier embodiment.

The adhesive of the invention can contain from about 0.2 to about 1 part per 100 parts of adhesive of a boron containing compound. A waterproofing or water resistant resin also can be incorporated in the adhesive in an amount from about 0.5 to about 5 parts per 100 parts of adhesive depending upon the type of resin used and the desired degree of waterproofing.

In a preferred embodiment, the adhesive is a carrier type or carrier-no-carrier type adhesive and the fiber is corn fiber which is solubilized in situ during preparation of the carrier phase. A partially hydrolyzed, cold water soluble polyvinyl alcohol can be used in this embodiment and it can be further hydrolyzed in situ under the same conditions and simultaneously with the solubilization of the corn fiber.

The carrier type corrugating adhesive composition of the invention is made by separately preparing two intermediates and then combining them. This can be accomplished using a primary/secondary Stein-Hall system, a jet cooker, a high shear mixer or other systems and equipment as will be apparent to those skilled in the art. One intermediate is called the carrier phase and the other is called the suspended phase.

The carrier phase is made by admixing the fiber and the optional added carbohydrate component with water. These components can be added to the water together or in any order. The combined amount of fiber and optional added carbohydrate component which is added is from about 10 to about 30 parts per 100 parts of carrier phase or from about 2 to about 6 parts per 100 parts of adhesive.

In the most preferred embodiment of the invention, the fiber is corn fiber which is employed in a carrier type adhesive. A suitable corn fiber is dietary corn fiber and it can be prepared according to U.S. Pat. Nos. 4,994,115 or 5,073,201. The corn fiber is admixed with the other ingredients in the preparation of the carrier phase. The components are continuously mixed and heated to a temperature from about 115° F. (46° C.) to about 180° F. (82° C.). Sufficient caustic is then added to provide an alkaline pH while continuing mixing and maintaining heating. Mixing and heating are continued for a sufficient time to solubilize the corn fiber in situ. The pH should exceed about 10 and preferably will exceed about 12. The sufficient time and temperature will generally be from about 10 to about 40 minutes at from about 115° F. (46° C.) to about 180° F. (82° C.). Lower temperatures generally correspond with longer times.

A preferred solubilized fiber of the invention, such as solubilized dietary corn fiber, has residual insoluble material having a particle size in the adhesive of less than about 0.005 inch, a geometric mean size of less than about 0.00005 inch and a median size of less than about 0.00005 inch.

Following the removal of heat, mixing can be continued to allow uniform cooling. Water can be added at this stage to speed cooling.

The suspended phase is made by admixing a carbohydrate component and, optionally, pre-solubilized fiber with heated water. The water is heated at a temperature from about 70° F. (21° C.) to about 105° F. (41° C.) and is mixed continuously. The carbohydrate component and optional pre-solubilized fiber is added in an amount from about 10 to about 30 parts per 100 parts of the corrugating adhesive, and preferably in an amount from about 15 to about 25 parts per 100 parts of the adhesive.

The polyvinyl alcohol can be added to the water at any time before, during or after adding the carbohydrate component and optional pre-solubilized fiber, or it can be added to the carrier phase or the overall adhesive mix in the same manner in which one skilled in the art would add it to a starch-based corrugating adhesive.

A boron containing compound such as boric acid or a boric acid salt must be added at some stage in the process to improve tack or stickiness. It may be added in the preparation of the carrier phase, the suspended phase, or in both phases. When a portion of the boron containing compound is added during the preparation of the carrier phase, it also improves the viscosity stability of the final adhesive product. Preferably, however, most of the boron containing compound is added to the suspended phase.

When the boron containing compound is added during the preparation of the carrier phase, it is added in an amount from about 0.03 to about 1 part per 100 parts of carrier phase or in an amount from about 0.01 to about 0.3 parts per 100 parts of adhesive. The boron containing compound added to the suspended starch phase is added in an amount to bring the total boron containing compound up to from about 0.2 to about 1 part per 100 parts of the adhesive.

The carrier phase is gradually added to a tank containing the suspended phase with continuous mixing of the contents of the tank. The temperature of the tank contents is maintained at from about 70° F. (21° C.) to about 120° F. (49° C.), preferably from about 90° F. (32° C.) to about 105° F. (41° C.), during the gradual addition. The amount of the carrier phase added is from about 15 to about 50 parts per 100 parts of adhesive.

A waterproofing or water resistant resin may be added to the suspended phase tank at any time in an amount from about 0.5 to about 5 parts per 100 parts of adhesive. It is preferable to add the resin following completion of all of the other adhesive preparation steps.

The individual components of the carrier type adhesive composition of the invention are described in detail below along with descriptions of their preferred embodiments.

FIBER

Any plant fiber can be used according to the invention and corn fiber produced by the corn wet milling industry is especially suitable, particularly dietary corn fiber which is sold under the designation PEERLESS® corn fiber by the Corn Products Unit of CPC International Inc., P. O. Box 8000, Englewood Cliffs, N.J. 07632 USA. Another preferred source of corn fiber is produced by the dry milling process, such as corn bran sold by Illinois Cereal Mills, 616 South Jefferson Avenue, Paris, Ill. 61944 as Code 97800 high fiber corn bran. (Dry millers may refer to corn fiber as corn bran. The terms corn fiber and corn bran are synonymous for purposes of this specification.) The corn fiber and/or bran must be ground to increase its surface area sufficiently to minimize the amount of residual insoluble material in the solubilized fiber and to allow the fiber to dissolve under relatively mild conditions. When the fiber is not ground to sufficient fineness, it dissolves poorly, particles float around in the preparation and a grainy adhesive is produced which plugs the hole in a Stein-Hall cup. Successful adhesives have been made when the fiber is sufficiently ground so that about 70% will pass through a −325 mesh screen (44 microns or 0.0017 inch).

CARBOHYDRATE

When a carbohydrate component is added to the adhesive of the invention, unmodified starch, carboxymethyl cellulose and other gums, dextran or dextrin can be used, but modified starch is preferred (especially in a carrier phase) because it enables the dissolution of substantially more solids (up to twice the amount, perhaps more, attainable with unmodified starch) in the adhesive composition and therefore contributes to the development of better pin adhesion and other adhesive characteristics. The reason is that modified starches, when pasted in water, are less viscous than their unmodified counterparts, and as a consequence they can "carry" more ungelatinized starch at practical viscosities.

The modified starch which is used in accordance with the present invention can be mechanically, chemically or heat modified. Compared to unmodified starches, modified starches improve paste stability compared with pearl starch and they frequently possess superior physical properties such as increased solubility, better film forming, increased whiteness, improved gel strength, viscosity stability, increased adhesivity, improved resistance to shear and increased resistance to freeze-thaw degradation. Starches derived from other genetic forms of corn, such as high amylose and waxy corn as well as sorghum varieties would also be suitable for such applications. Suitable chemically modified starches include modified oxidized starch such as hypochlorite-oxidized starch, acid-thinned starch, ethylated starch, cross-bonded starch and others which have reduced molecular weight, higher fluidity and/or functional sub groups.

Examples of chemically modified starches which can be used in the invention and are commercially available are SUREBOND® or STABLEBOND® modified starches which have residual carboxyl functionality and extreme uniformity and are sold by the Corn Products Unit of CPC International Inc., P. O. Box 8000, Englewood Cliffs, N.J. 07632 USA.

Unmodified starches which can be used in the carrier phase are the same as those described in more detail below in the discussion of the suspension phase starch.

The dextrins which can be used in the carrier phase are prepared by heating starch under various conditions as more fully described in Whistler, R. L. et al., *Starch: Chemistry and Technology*, 2nd edition, Chapter XX, pages 596–607, Academic Press, Inc. (New York, 1984).

If the adhesive of the invention has a suspension phase and a carbohydrate is added to the suspension phase, the preferred carbohydrate would be unmodified starch which is a commodity chemical produced from the root, stem or fruit from a number of plants. It is a high molecular weight carbohydrate polymer which is comprised of linear and branched polysaccharide polymers. Modified starch and/or dextrin can be used as the suspension phase starch, but unmodified starch is more economical.

POLYVINYL ALCOHOL

Polyvinyl alcohol is a polyhydroxy secondary alcohol derived from a series of vinyl alcohol monomer units which by themselves do not exist. The structure for polyvinyl alcohol is shown below, with no intent to show tacticity of any kind.

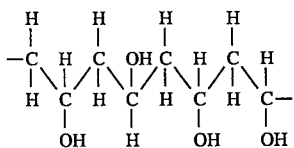

The polymer is manufactured first as polyvinyl acetate. Its molecular weight can be controlled by varying the polymerization conditions. The average molecular weight generally ranges from about 9,000 to 186,000 molecular weight units, but can be lower or higher. Depending on the polymer properties which are desired for a particular application, the acetate is then hydrolyzed, but not necessarily to completion. The degree of hydrolysis can theoretically range from 0 to 100%, but commercially available products generally range from 78 to 100% (which means there can be anywhere from 0 to 22% residual acetate functionality present in the polyvinyl alcohol in commercially available products). Tackified grades of polyvinyl alcohol derived from fully hydrolyzed polyvinyl alcohol which are already borated are also available commercially. It has been determined that these products provide improved water resistance, but many of them are highly viscous, not easily dispersible, and can cause gelation problems in corrugating applications.

The chemistry and properties of polyvinyl alcohol are discussed in detail in the Encyclopedia of Polymer Science and Technology, Volume 14, Chapter V (John Wiley & Sons, Inc., 1971). In particular, solubilities are discussed on pages 162 and 163 where it is indicated that partially hydrolyzed polyvinyl alcohols are cold water soluble and more fully hydrolyzed polyvinyl alcohols are not. Cold water solubility is generally measured in the industry at an ambient temperature of 70° F. (21° C.) using a stirrer. The dependence of the solution viscosity of polyvinyl alcohol on the degree of polymerization and the degree of hydrolysis is discussed and illustrated on page 158 of the reference.

Cold water soluble polyvinyl alcohol, which generally has a degree of hydrolysis of less than about 92%, can be added at any stage of the process of making the corrugating adhesive of the invention. When the corrugator wishes to further hydrolyze a cold water soluble polyvinyl alcohol in situ, the preferred polyvinyl alcohol will have a molecular weight of less than about 30,000 preferably less than about 15,000, and most preferably less than about 11,000 molecular weight units, and have a degree of hydrolysis of less than about 92%, preferably less than about 88%. Suitable commercially available polyvinyl alcohols include AIRVOL® 603, AIRVOL® 203, GELVATOL® 40-10 and GELVATOL® 40-20 available from Air Products and Chemicals, Inc., Polymer Chemicals Division, Allentown, Pa. 18795 U.S.A. The viscosity of the polyvinyl alcohols used in accordance with the present invention range from about 2 centipoise to about 20 centipoise, preferably from about 2 centipoise to about 4 centipoise, at a temperature of 68° F. (20° C.) in a 4% aqueous solution.

Cold water insoluble polyvinyl alcohols, which generally have a degree of hydrolysis from about 95 to 100%, can be added in the form of a solution of polyvinyl alcohol in water at any stage in the manufacture of the adhesive, or the polyvinyl alcohol itself can be added at a stage when the adhesive mix is hot or prior to heating at a temperature at which the alcohol will go into solution (with agitation if needed).

Polyvinyl alcohols having an intermediate degree of hydrolysis, between those discussed above, can be added in the form of a solution or under conditions of temperature and agitation which will cause them to go into solution as will be apparent to those skilled in the art.

BORON CONTAINING COMPOUND

Any boron containing compound having free hydroxyl groups attached to the boron atoms can be used. The most commonly used compounds are commercial boric acid (ortho boric acid, $H_3BO_3$ and its hydrated forms $H_3BO_3.xH_2O$) and borax (sodium tetraborate decahydrate, $Na_2B_4O_7.10H_2O$ and other hydrate and anhydrous forms).

CAUSTIC

Any strong base can be used, but the preferred bases are alkali metal hydroxides. Calcium hydroxide is the most preferred functionally, and the most preferred economically are sodium and potassium hydroxide.

WATERPROOFING/WATER RESISTANCE

Starch-based corrugating adhesives prepared with solubilized fiber have excellent waterproof characteristics compared with the same adhesive made without solubilized fiber. If more enhanced waterproofing or water resistance is desired, however, conventional resins which are employed in the corrugating industry can be used.

Preferred waterproofing or water resistant resins include those which upon heating in basic media generate cross-linking species which react and cross-link with any available hydroxyl group in the starch, polyvinyl alcohol, hemicellulose or cellulose molecules. The cross-linking action reduces the hydrophilic nature and water-solubility of the solubilized fiber, carbohydrate and other polyhydroxy molecules by effectively removing the availability of hydroxyl groups to water and by developing hydrophobic, aliphatic cross-linking moieties. Condensation products from the reaction of a ketone and an aldehyde compound are suitable. These resins are characterized as polyether polymers or condensation polymers, but can contain a variety of other monomers such as urea, melamine, and the like. The most preferred resins are acetone-formaldehyde resins, acetone-urea-formaldehyde resins and acetone-melamine-formaldehyde resins comprising about 1.5–30% by weight acetone, about 5–50% by weight formaldehyde and about 0–15% of a third monomer. A commercially available cross-linking resin which is suitable for use in the present invention is the ASTROMEL® series of resins manufactured by Astro Industries, Inc., 114 Industrial Boulevard, P. O. Box 2559, Morganton, N.C. 28655 USA.

EXAMPLE 1

Adhesive Preparation

Five adhesive samples were prepared employing various amounts of polyvinyl alcohol (PVOH). As summarized in Table I, 415 milliliters water was added to a primary mixer and heated while mixing to a temperature of 150° F. (66° C.). With continued mixing, AIRVOL® 603 polyvinyl alcohol (having a degree of hydrolysis from about 78–82%, an approximate number average molecular weight from 9,000 to 10,000 and a viscosity from about 2.7 to about 3.5 centipoise in a 40% aqueous solution at 68° F. (20° C.)) was added in varying amounts, as indicated, followed by adding a starch-fiber blend made from 2 parts of G551 STABLEBOND® modified starch for each 1 part of CODE 97800 high fiber corn bran, in varying amounts, as indicated. Mixing was continued for five minutes followed by the addition of 41 grams of caustic (sodium hydroxide) and mixing continued for another 20 minutes until 373 milliliters of additional water was added and mixed in to complete the primary mix.

In the secondary mixer, with continuous mixing, 1328 milliliters of water was added and heated to 90° F. (32° C.). Seven hundred fifty grams of starch was added followed by 12.5 grams of 10 molar Borax.

The contents of the primary and secondary mixer were mixed to make the finished paste. Viscosity was measured in seconds using a Stein-Hall cup.

The most promising adhesive made was Run D which had 44 grams PVOH (about 1.45% PVOH based on total adhesive). Run B had an infinite viscosity with 62.5 grams PVOH (about 2.05% PVOH based on total adhesive). The lowest amount of PVOH used was in Run A which had 1.8 grams, or 0.06% PVOH based on total adhesive.

Corrugated Board Preparation

The finished paste was held for ½ to 2 hours at ambient temperature before it was used to make a double-back bond on 2"×5" test sheets, completing the finished corrugated board. Paste was spread across a stainless steel plate using a spreading gauge set to 10 microns. A commercially supplied piece of single face was pressed into the adhesive spread across the plate. The liner used to form the top of the finished board was laid on top of the adhesive wetted flutes of the single-face before going into the laboratory equivalent of the heating plates of a commercial doublebacker.

A Carver press was used to produce the double-back bond. The press was equipped with top and bottom heating plates set to 310° F. (154° C.). The press was closed to allow the single face to just touch the liner without crushing the flutes. Zero pressure registered on the pressure gauge. Residence time in the press was 10 seconds. The board samples were allowed to cool on a cold flat surface after they were removed.

After the board samples were made, they were subjected to two-one-two Technical Association of Pulp and Paper Industry, Inc. (TAPPI) tests. Dry PIN Adhesion testing was carried out to determine bond strength and the percentage of paper versus adhesive failure. The test for Dry Pin Adhesion (TAPPI T821) for bond strength followed the test methods published in TAPPI Test Methods 1989, available from TAPPI, One Dunwoody Park, Atlanta, Ga. 30341 U.S.A.

TABLE I

| | Primary/secondary single viscosity mix | | | | |
|---|---|---|---|---|---|
| Run | Control | A | B | C | D |
| Primary Mix | | | | | |
| Water, ml | 415 | 415 | 415 | 415 | 415 |
| Heat, °F. | 150 | 150 | 150 | 150 | 150 |
| PVOH, g (#603) | 9 | 1.8 | 62.5 | 31 | 44 |
| Starch-Fiber blend, g | 125 | 125 | 62.5 | 94 | 81 |
| Mix, min | 5 | 5 | 5 | 5 | 5 |
| 50% Caustic, g | 41 | 41 | 41 | 41 | 41 |
| Mix, min | 20 | 20 | 20 | 20 | 20 |
| Water, ml | 373 | 373 | 373 | 373 | 373 |
| Secondary mixer | | | | | |
| Water, ml | 1328 | 1328 | 1328 | 1328 | 1328 |
| Heat, °F. | 90 | 90 | 90 | 90 | 90 |
| Starch, g | 750 | 750 | 750 | 750 | 750 |
| Borax (10 mol), g | 12.5 | 12.5 | 12.5 | 12.5 | 12.5 |
| Finished paste | | | | | |
| Temp, °F. | 99 | 98 | 103 | 98 | 99 |
| Viscosity, sec | 29 | 25 | (*) | 25 | 50 |
| Gel point, °F. | 143 | 144 | (**) | 146 | 148 |
| Test samples of board | | | | | |
| Dry pin adhesion, lb/lin ft (n = 5) | 75.2 | 84.8 | — | 68.0 | 70.4 |
| Paper failure, % | 30 | 45 | — | 50 | 15 |
| Adhesive Failure, % | 70 | 55 | — | 50 | 85 |

(*) infinite
(**) not run

EXAMPLE 2

Following dissolution, the various kinds of fiber used in accordance with the invention have a certain amount of residual insoluble material. While the mechanism is not known, applicants believe that this material contributes to the improved properties of the adhesives of the invention. Accordingly, we have measured the particle sizes of this material.

The term "size" rather than terms such as "diameter" and "length" have been used to describe the residual insoluble material (referred to herein as "particles") present in the carrier phase or the adhesives of the present invention because of the limitations on the analytical techniques which are available to measure the sizes of microscopic particles which are dispersed in a liquid. When the particles are viewed with microscopic magnification, they generally appear to be rhombohedral in shape and/or platelet shaped, the length of the fibers being approximately equal to the width. The term "size" therefore refers both to length and width.

In order to measure the size of the particles in the adhesive or carrier phase compositions of the invention, ground corn fiber was treated with caustic under the same conditions as is used to solubilize ground corn fiber in situ when preparing the carrier phase in accordance with the invention and then the particle size was measured by Particle Data Laboratories, Ltd., 238 North York, Elmhurst, Ill. 60126 U.S.A., using an ELZONE™ particle size analyzer. Particle volumes were measured and size was determined by assuming the volumes were for spherical particles and the size (i.e. the diameter) was calculated based on the formula for determining diameter based on the known volume of a sphere. All sizes are expressed in microns.

The data generated is set forth in Table II.

TABLE II

| Chnl | Size | Volume | Cuml % |
|---|---|---|---|
| 4 | 0.548 | 0 | 100.0 |
| 5 | 0.574 | 2.84E7 | 99.9 |
| 6 | 0.60 | 3.07E7 | 99.7 |
| 7 | 0.629 | 3.31E7 | 99.5 |
| 8 | 0.659 | 3.61E7 | 99.3 |
| 9 | 0.690 | 3.84E7 | 99.0 |
| 10 | 0.722 | 4.01E7 | 98.8 |
| 11 | 0.76 | 4.13E7 | 96.5 |
| 12 | 0.792 | 4.27E7 | 98.3 |
| 13 | 0.829 | 4.30E7 | 96.0 |
| 14 | 0.868 | 4.57E7 | 97.7 |
| 15 | 0.909 | 4.76E7 | 97.4 |
| 16 | 0.95 | 4.96E7 | 97.1 |
| 17 | 0.997 | 5.36E7 | 97.7 |
| 18 | 1.044 | 5.78E7 | 96.4 |
| 19 | 1.093 | 6.03E7 | 96.0 |
| 20 | 1.145 | 6.22E7 | 95.6 |
| 21 | 1.2 | 6.56E7 | 95.2 |
| 22 | 1.255 | 7.00E7 | 94.8 |
| 23 | 1.314 | 7.35E7 | 94.3 |
| 24 | 1.376 | 7.66E7 | 93.8 |
| 25 | 1.441 | 7.94E7 | 93.3 |
| 26 | 1.5 | 8.28E7 | 92.8 |
| 27 | 1.580 | 8.45E7 | 92.2 |
| 28 | 1.655 | 8.52E7 | 91.7 |
| 29 | 1.733 | 8.67E7 | 91.1 |
| 30 | 1.814 | 9.12E7 | 90.6 |
| 31 | 1.9 | 9.12E7 | 90.0 |
| 32 | 1.990 | 9.00E7 | 89.4 |
| 33 | 2.083 | 9.53E7 | 88.8 |
| 34 | 2.181 | 8.52E7 | 88.2 |
| 35 | 2.284 | 8.76E7 | 87.6 |
| 36 | 2.4 | 9.06E7 | 87.1 |
| 37 | 2.505 | 9.15E7 | 86.5 |
| 38 | 2.623 | 9.29E7 | 85.9 |
| 39 | 2.746 | 9.08E7 | 85.3 |
| 40 | 2.876 | 8.47E7 | 84.7 |

TABLE II-continued

| Chnl | Size | Volume | Cuml % |
|---|---|---|---|
| 41 | 3.0 | 7.84E7 | 84.2 |
| 42 | 3.153 | 7.22E7 | 83.7 |
| 43 | 3.302 | 6.77E7 | 83.3 |
| 44 | 3.457 | 6.37E7 | 82.8 |
| 45 | 3.620 | 6.09E7 | 82.4 |
| 46 | 3.8 | 5.89E7 | 82.0 |
| 47 | 3.970 | 5.85E7 | 81.7 |
| 48 | 4.157 | 6.01E7 | 81.3 |
| 59 | 4.353 | 6.20E7 | 80.9 |
| 50 | 4.558 | 6.42E7 | 80.5 |
| 51 | 4.8 | 6.64E7 | 80.0 |
| 52 | 4.998 | 6.74E7 | 79.6 |
| 53 | 5.233 | 6.97E7 | 79.2 |
| 54 | 5.480 | 7.33E7 | 78.7 |
| 55 | 5.738 | 7.65E7 | 78.2 |
| 56 | 6.0 | 8.18E7 | 77.7 |
| 67 | 6.291 | 8.33E7 | 77.2 |
| 58 | 6.588 | 8.39E7 | 76.6 |
| 69 | 6.898 | 8.81E7 | 76.1 |
| 60 | 7.224 | 9.42E7 | 75.5 |
| 61 | 7.6 | 9.82E7 | 74.9 |
| 62 | 7.921 | 1.02E8 | 74.2 |
| 63 | 8.294 | 1.09E8 | 73.5 |
| 64 | 8.685 | 1.16E8 | 72.8 |
| 65 | 9.094 | 1.21E8 | 72.1 |
| 66 | 9.5 | 1.30E8 | 71.2 |
| 67 | 9.971 | 1.37E8 | 70.4 |
| 68 | 10.44 | 1.45E8 | 69.5 |
| 69 | 10.93 | 1.53E8 | 68.5 |
| 70 | 11.45 | 1.64E8 | 67.5 |
| 71 | 12. | 1.73E8 | 66.4 |
| 72 | 12.55 | 1.82E8 | 65.2 |
| 73 | 13.14 | 1.92E8 | 64.0 |
| 74 | 13.76 | 2.05E8 | 62.8 |
| 75 | 14.41 | 2.16E8 | 61.4 |
| 76 | 15. | 2.26E8 | 60.0 |
| 77 | 15.80 | 2.38E8 | 58.5 |
| 78 | 16.55 | 2.49E8 | 56.9 |
| 79 | 17.33 | 2.57E8 | 55.3 |
| 80 | 18.14 | 2.68E8 | 53.6 |
| 81 | 19. | 2.80E8 | 51.8 |
| 82 | 19.90 | 2.90E8 | 49.9 |
| 83 | 20.83 | 2.95E8 | 48.1 |
| 84 | 21.81 | 3.03E8 | 46.1 |
| 85 | 22.84 | 3.10E8 | 44.1 |
| 86 | 24. | 3.14E8 | 42.1 |
| 87 | 25.05 | 3.15E8 | 40.1 |
| 88 | 26.23 | 3.15E8 | 38.1 |
| 89 | 27.46 | 3.15E8 | 36.0 |
| 90 | 28.76 | 3.14E8 | 34.0 |
| 91 | 30. | 3.07E8 | 32.0 |
| 92 | 31.53 | 2.94E8 | 30.0 |
| 93 | 33.02 | 2.88E8 | 28.2 |
| 94 | 34.57 | 2.91E8 | 26.3 |
| 95 | 36.20 | 2.85E8 | 26.4 |
| 96 | 38. | 2.74E8 | 22.6 |
| 97 | 39.70 | 2.75E8 | 20.8 |
| 98 | 41.57 | 2.79E8 | 19.1 |
| 99 | 43.53 | 2.72E8 | 17.3 |
| 100 | 45.58 | 2.59E8 | 15.6 |
| 101 | 48. | 2.52E8 | 13.9 |
| 102 | 49.96 | 2.43E8 | 12.3 |
| 103 | 52.33 | 2.31E8 | 10.8 |
| 104 | 54.80 | 2.15E8 | 9.34 |
| 105 | 57.38 | 1.92E8 | 8.03 |
| 106 | 60. | 1.75E8 | 6.84 |
| 107 | 62.91 | 1.68E8 | 5.73 |
| 108 | 65.88 | 1.52E8 | 4.70 |
| 109 | 68.98 | 1.33E8 | 3.78 |
| 110 | 72.24 | 1.09E8 | 3.00 |
| 111 | 76. | 9.32E7 | 2.34 |
| 112 | 79.21 | 7.95E7 | 1.78 |
| 113 | 82.94 | 6.41E7 | 1.32 |
| 114 | 86.85 | 5.04E7 | 0.95 |
| 115 | 90.94 | 3.59E7 | 0.67 |
| 116 | 95. | 2.88E7 | 0.46 |

TABLE II-continued

| Chnl | Size | Volume | Cuml % |
|---|---|---|---|
| 117 | 99.71 | 1.83E7 | 0.31 |
| 118 | 104.4 | 1.31E7 | 0.21 |
| 119 | 109.3 | 9865569 | 0.13 |
| 120 | 114.5 | 7681644 | 0.06 |
| 121 | 120. | 6392795 | 0.03 |
| 122 | 125.5 | 1575967 | 0.01 |
| 123 | 131.4 | 0 | 0.00 |

Having set forth the general nature and some specific examples of the present invention, the scope of the invention is now more specifically set forth in the appended claims.

What is claimed is:

1. A carrier, no-carrier or carrier-no-carrier corrugating adhesive composition wherein the improvement comprises incorporating solubilized fiber in the adhesive composition as a complete or partial substitute for starch and adding from about 0.01 to about 2 parts per 100 parts of adhesive of polyvinyl alcohol.

2. The composition of claim 1 which in an aqueous emulsion comprises water; from about 5 to about 35 parts solubilized fiber per 100 parts of adhesive and, optionally, an added carbohydrate component in an amount from about 0.1 to about 99% by weight based on total added carbohydrate and solubilized fiber; from about 0.05 to about 1.5 parts polyvinyl alcohol per 100 parts of adhesive; and sufficient caustic to attain a pH from about 8 to about 14.

3. The composition of claim 2 wherein the solubilized fiber is present in an amount from about 15 to about 25 parts per 100 parts of adhesive.

4. The composition of claim 2 wherein from about 2 to about 6 parts per 100 parts of adhesive of the solubilized fiber is in a carrier phase.

5. The composition of claim 4 having a suspended phase comprised of from about 10 to about 25 parts per 100 parts of adhesive of the added carbohydrate component.

6. The composition of claim 4 wherein fiber has been solubilized in situ in preparing the carrier phase.

7. The composition of claim 6 wherein the polyvinyl alcohol is further hydrolyzed in situ.

8. The composition of claim 1 further comprising a boron containing compound in an amount of from about 0.2 to about 1 part per 100 parts of adhesive.

9. The composition of claim 1 wherein the polyvinyl alcohol is present in an amount from about 0.1 to about 1.5 parts polyvinyl alcohol per 100 parts of adhesive.

10. A method of making a carrier phase composition for use in a carrier or a carrier-no-carrier corrugating adhesive composition which comprises the following sequential steps with continuous mixing:

a) admixing corn fiber with water, polyvinyl alcohol and, optionally, an added carbohydrate component in a primary mixer and heating for at least about 1 minute at a temperature of from about 46° C. to about 82° C.;

b) admixing an aqueous solution of caustic to attain a pH from about 8 to about 14 and continuing mixing; and c) admixing additional water.

11. The method of claim 10 comprising the additional step of admixing from about 0.03 to about 1 part per 100 parts of carrier phase of a boron containing compound.

12. A method of making a carrier corrugating adhesive composition which comprises:

a) preparing a carrier phase by the following sequential steps with continuous mixing
admixing corn fiber with water, polyvinyl alcohol and, optionally, an added carbohydrate component in a primary mixer and heating for at least about 1 minute at a temperature from about 46° C. to about 82° C.;
admixing an aqueous solution of caustic to attain a pH from about 8 to about 14 and;
admixing additional water;

b) preparing a suspended phase by the following sequential steps with continuous mixing
charging a secondary mixer with water and heating the water to a temperature from about 21° C. to about 41° C.; and
admixing with the heated water a carbohydrate component and, optionally, solubilized fiber;

c) with continuous mixing, gradually admixing the contents of the primary mixer with the contents of the secondary mixer.

13. The method of claim 12 comprising the additional step of admixing a boron containing compound to the carrier phase, the suspended phase or both the carrier phase and the suspended phase wherein the total amount of boron containing compound added is from about 0.2 to about 1 part per 100 parts of adhesive.

14. A method of making corrugated board comprising joining a corrugated medium to at least one liner using a corrugating adhesive composition which in an aqueous emulsion comprises water; from about 5 to about 35 parts per 100 parts of adhesive of solubilized fiber, from about 0.01 to about 2 parts of polyvinyl alcohol per 100 parts of adhesive and, optionally, an added carbohydrate component; and sufficient caustic to attain a pH from about 8 to about 14.

15. The method of claim 14 wherein from about 2 to about 6 parts per 100 parts of adhesive of the solubilized fiber is in a carrier phase.

16. The method of claim 15 wherein fiber has been solubilized in situ in preparing the carrier phase.

17. The method of claim 16 wherein the polyvinyl alcohol has been further hydrolyzed in situ.

18. The method of claim 14 wherein the polyvinyl alcohol is present is an amount from about 0.05 to about 1.5 parts per 100 parts of adhesive.

* * * * *